United States Patent Office.

WILLIAM R. PATRICK, OF MARINETTE, WISCONSIN.

PROCESS OF PREPARING WOOD FOR MAKING PAPER-PULP.

SPECIFICATION forming part of Letters Patent No. 234,143, dated November 9, 1880.

Application filed June 7, 1880. (No model.)

*To all whom it may concern:*

Be it known that I, WILLIAM R. PATRICK, of Marinette, in the county of Marinette and State of Wisconsin, have invented a certain new and useful Improvement in Processes of Preparing Wood for Making Paper-Pulp, (Case F;) and I declare that the following is a full, clear, and exact description of the same.

My invention relates to processes of preparing wood for grinding in the manufacture of wood paper-pulp; and it consists in subjecting the wood to the alternate action of steam and water, for the purpose of thoroughly saturating the wood and dissolving the resins, acids, and other deleterious substances combined with its fiber, and then carrying those substances away by the percolation of the water. The fiber is thus more effectually cleansed of its impurities than it could be by the action of steam or water alone. The wood is cut and prepared so as to be in the usual form for processes of this nature, and is then packed in a tank or chest of suitable construction, which is closed, with the exception of the necessary openings for the admission and outlet of water and steam, as hereinafter described.

The water may be admitted through any suitable opening, and the tank has a suitable opening at or near the bottom, through which the water may be discharged as rapidly and freely as it can be admitted. One or more suitable steam-pipes are also introduced into the tank at or near the bottom. These have perforations, through which the steam may pass out into the wood. The tank may also be advantageously provided with a safety-valve to relieve any undue pressure of steam which may accidentally occur. The admission of steam is preferably, though not necessarily, first. No pressure is used except such as is necessarily attendant on the admission of the steam—that is, the steam is not superheated or under high pressure, but is simply ordinary live steam, or even exhaust-steam, (though live steam is preferable,) discharged by free inlets, preferably into the lower part of the tank. The steam thus admitted permeates the whole mass of wood, dissolving the resins, acids, and other impurities combined with the fiber. After the wood has been thus treated for some minutes, ordinarily about half an hour, the steam may be shut off. Then a stream of water, preferably heated to a temperature somewhat below the boiling-point, (though cold water, or water of ordinary natural temperature, will effect the same result, but less expeditiously,) is turned upon the mass of wood. It percolates the wood, taking up the impurities which the steam has dissolved.

The water-outlet in the lower part of the tank may be closed before the water is admitted, and kept so for a few minutes after the tank is full, in order to allow the water to take up the impurities more thoroughly. Then it is discharged. The wood should be repeatedly subjected to this process of alternate saturation with steam and percolation of water until it is soft, clean, and white, or very nearly white. After each repetition inspection of the wood will enable the operator to judge how far it is advanced toward preparation for grinding. Ordinarily the alternate steamings and washings will need to be kept up for from six to eighteen hours, according to the hardness of the wood and the proportion of foreign substances which it contains. The softer woods—such as spruce and poplar—can be more readily prepared by this process than the harder species.

What I claim as my invention, and desire to secure by Letters Patent, is—

In the manufacture of wood paper-pulp, the process hereinbefore described for softening and cleansing the wood before grinding the same, consisting in placing the wood in a closed tank and subjecting it to the alternate action of steam and water, for the purposes set forth.

WILLIAM R. PATRICK.

Witnesses:
JOHN B. FAIRCHILD,
JAMES M. MOORE.